US012512594B2

(12) United States Patent
Park et al.

(10) Patent No.: US 12,512,594 B2
(45) Date of Patent: Dec. 30, 2025

(54) SANDWICH PANEL TYPE ANTENNA INTEGRATED LATTICE CORE

(71) Applicant: KOREA AEROSPACE RESEARCH INSTITUTE, Daejeon (KR)

(72) Inventors: Illkyung Park, Daejeon (KR); Jae Won Chang, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 18/509,191

(22) Filed: Nov. 14, 2023

(65) Prior Publication Data

US 2024/0162614 A1 May 16, 2024

(30) Foreign Application Priority Data

Nov. 14, 2022 (KR) ........................ 10-2022-0151587

(51) Int. Cl.
*H01Q 9/04* (2006.01)
*H01Q 1/22* (2006.01)

(52) U.S. Cl.
CPC ............. *H01Q 9/0407* (2013.01); *H01Q 1/22* (2013.01)

(58) Field of Classification Search
None
See application file for complete search history.

(56) References Cited

U.S. PATENT DOCUMENTS

2005/0161154 A1* 7/2005 Anderson ............... B32B 27/26 156/278
2016/0361889 A1* 12/2016 Bartolome ................ B32B 5/12
2017/0301980 A1* 10/2017 Lavin ...................... H01Q 1/287
2019/0337220 A1* 11/2019 Beyerle ................ H01Q 17/002

FOREIGN PATENT DOCUMENTS

JP H08274527 A 10/1996
KR 20100078693 A 7/2010

OTHER PUBLICATIONS

Xie, Z. et al., "Design and development of conformal antenna composite structure," Smart Materials and Structures, vol. 26, No. 9, Aug. 9, 2017, 11 pages.
European Patent Office, Extended European Search Report Issued in Application No. 23209746.9, Mar. 26, 2024, Germany, 14 pages.

* cited by examiner

*Primary Examiner* — Crystal L Hammond
(74) *Attorney, Agent, or Firm* — McCoy Russell LLP

(57) ABSTRACT

Provided is an antenna integrated structure in which an antenna is inserted into ground vehicle, marine ship and aircraft structure, and more particularly, a sandwich panel type antenna integrated latticecore having a structure for improving communication performance of an antenna module.

15 Claims, 13 Drawing Sheets

SANDWICH PANEL TYPE ANTENNA INTEGRATED LATTICE CORE

CROSS-REFERENCE TO RELATED APPLICATION

This application claims priority under 35 U.S.C. § 119 to Korean Patent Application No. 10-2022-0151587, filed on Nov. 14, 2022, in the Korean Intellectual Property Office, the disclosure of which is incorporated herein by reference in its entirety.

TECHNICAL FIELD

The following disclosure relates to an antenna integrated structure in which an antenna is inserted into ground vehicle, marine ship and aircraft structure, and more particularly, to a sandwich panel type antenna integrated latticecore having a structure for improving communication performance of an antenna module.

BACKGROUND

A protruding antenna applied to a conventional ground vehicle, marine ship, and aircraft may increase external drag, reduce stealth performance, and increase the number and weight of parts for installation on a structure. In order to compensate for these disadvantages, research is continuously being conducted to develop a 'structure-embedded antenna' in which an antenna is inserted into the structure, or an 'antenna integrated structure' in which the structure and the antenna are integrated with each other.

A method being developed is to dispose a patch-type antenna (or an electromagnetic (EM) radiator) in a sandwich core of the conventional antenna integrated structure or use one of stacked layers of laminate composites as a layer serving as the antenna.

For example, the antenna integrated structure in which the antenna is disposed in the sandwich core may use a method of directly attaching an antenna layer to a lower surface of an upper face sheet for effective emission of electromagnetic (EM) waves and improvement of structural integrity.

FIG. 1 shows a schematic cross-sectional view of a conventional antenna integrated structure 10. As shown in the drawing, in the antenna integrated structure 10, an antenna module 13 and a sandwich core 14 may be sequentially stacked between an upper face sheet 11 and a lower face sheet 12, and the antenna module 13 may be directly attached to the upper face sheet 11 as described above.

In the conventional antenna integrated structure 10 as above, the antenna module 13 may be easily damaged or broken due to structural deformation caused by load support or an external environment such as an impact. Therefore, the conventional antenna integrated structure may have a limitation in commercialization due to its poor structural efficiency and durability.

SUMMARY

An embodiment of the present disclosure is directed to providing a sandwich panel type antenna integrated lattice core which may use a structure in which an antenna module is surrounded by two sandwich cores for the antenna module to be disposed at the center of a sandwich composite core to thus be easily assembled and prevent damage or breakage of the antenna module by an external impact.

In one general aspect, provided a sandwich panel type antenna integrated lattice core, the lattice core including: a core base having a certain area space formed below an upper surface for an antenna module to be inserted into an upper center; and a core cap coupled to the upper surface of the core base to seal the space, wherein each of the core base and the core cap has a plurality of sandwich panel-shaped core units repeatedly coupled with each other in a surface direction.

The core base may include a core cap accommodation groove recessed downward from a center of the upper surface for the antenna module and the core cap to be accommodated in the groove, and a periphery of an upper surface of the core cap and a periphery of the upper surface of the core base may match each other when the core cap is accommodated in the core cap accommodation groove.

The core cap may include an antenna module accommodation groove recessed downward from a lower surface to accommodate and fix the antenna module thereto for the antenna module to be disposed in a center of the lattice core when the core cap is accommodated in the core cap accommodation groove.

The core cap accommodation groove may include a first coupling part formed along an inner periphery, the core cap may include a second coupling part formed along an outer periphery, the first coupling part may have concave and convex parts repeatedly formed along the periphery, and the second coupling part may have convex and concave parts formed along the periphery to correspond to the concave and convex parts to thus couple the core cap to the core base by fit-coupling the first coupling part with the second coupling part.

A cylinder-shaped accommodation hole for application of a power feeder of the antenna module may be formed in a lower surface of the core cap accommodation groove and passes through the core base.

In the lower surface of the core cap accommodation groove, a plurality of lower plate units may be spaced apart from each other, and fixed and supported by the core unit.

The lower surface of the core cap accommodation groove may be cut horizontally and vertically by the lower plate unit.

In a first side plate forming a side surface of the power feeder accommodation hole, a plurality of first panels may be spaced apart from each other along its periphery, and fixed and supported by being coupled with the core unit.

The core unit may include: a flat upper flange; a flat lower flange disposed below the upper flange; a rod connecting the upper flange with the lower flange; a first arm extending outward in a plane direction of the upper flange and extending obliquely downward; a second arm extending outward in a plane direction of the lower flange and extending obliquely upward; a third arm extending outward in a plane direction of the rod and extending obliquely downward; and a fourth arm extending outward in the plane direction of the rod and extending obliquely upward. In addition, the core unit may include: a first floor where an end of the second arm and an end of the third arm are coupled with each other; a second floor where an end of the third arm that is disposed at a center of the rod and an end of the fourth arm are coupled with each other; and a third floor where an end of the first arm and an end of fourth arm are coupled with each other.

The plurality of core units may be repeatedly formed and coupled with each other in the surface direction. In addition, each of the first to fourth arms may have an upward or downward inclination angle of 40 to 50 degrees.

The core cap may include the core unit having a repetitive pattern, and a second side plate may surround a periphery of the core unit in the surface direction along its periphery.

The second side plate may have a plurality of second panels spaced apart from each other along its periphery, and fixed and supported by being coupled with the core unit.

The core cap may transmit a compressive load applied to the core cap to the core base as a lower edge of the core cap is in direct contact with a lower edge of the core cap accommodation groove of the core base.

A fixing protrusion for fixing the antenna module during fit-coupling of the antenna module may protrude inward from an inner surface of the antenna module accommodation groove.

A load transmitted to the core cap may be distributed by being sequentially transmitted to the core cap, the core unit disposed in the core cap, the antenna module, the core base, and the core unit disposed in the core base.

DETAILED DESCRIPTION OF EMBODIMENTS

Hereinafter, an embodiment of the present disclosure is described in detail with reference to the accompanying drawings.

Figure 1:
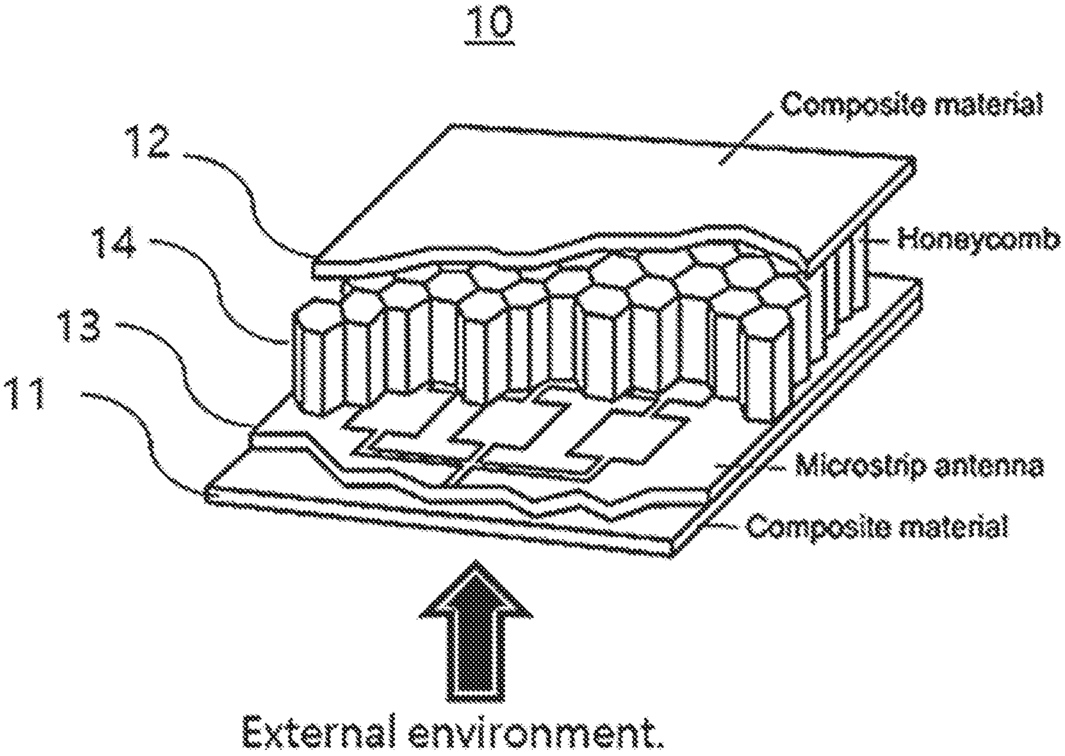
FIG. 1 (Prior Art)
FIG. 1 is an exploded perspective view of a conventional antenna integrated structure.
Figure 2:
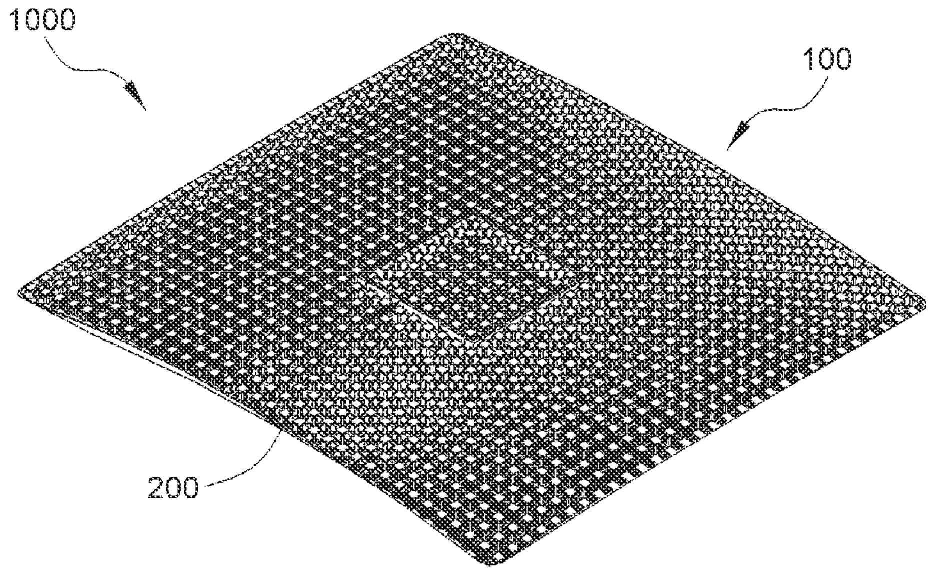
FIG. 2 is an overall perspective view of a lattice core according to an embodiment of the present disclosure.
Figure 3:
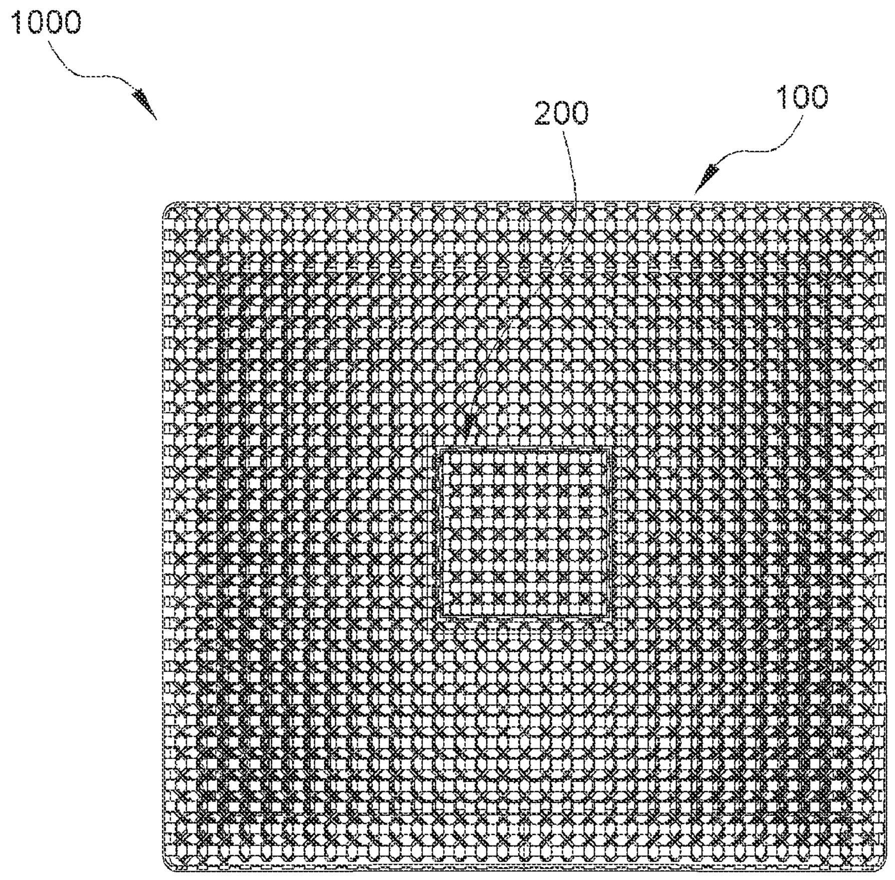
FIG. 3 is a plan view of the lattice core according to an embodiment of the present disclosure.

FIG. 2 is an overall perspective view of an antenna integrated lattice core 1000 according to an embodiment of the present disclosure; and FIG. 3 is a plan view of the antenna integrated lattice core 1000 according to an embodiment of the present disclosure.

As shown in the drawings, the lattice core 1000 may include a core base 100 and a core cap 200 coupled with each other. A certain area space may be formed below an upper center of the core base 100 for an antenna module 300 (see FIG. 13) to be inserted thereto, and the core cap 200 may be coupled to the upper center of the core base 100 to seal the space.

The antenna module 300 may be a normal communication antenna module, and may be, for example, an embedded electromagnetic (EM) Radiator.

In addition, the antenna module 300 may use a microstrip patch antenna shape. In addition, the antenna module 300 may use a pattern to improve a beam width.

The core base 100 may surround a lower side of the antenna module 300 to protect the antenna module 300 from an external pressure or an external impact. The core base 100 may include a core cap accommodation groove 110 recessed downward from the center of an upper surface for the antenna module 300 and a lower end of the core cap 200 to be accommodated therein. Therefore, a periphery of an upper surface of the core cap 200 and a periphery of the upper surface of the core base 100 may match each other when the core cap 200 is accommodated in the core cap accommodation groove 110.

The core base 200 may surround an upper side of the antenna module 300 to protect the antenna module 300 from the external pressure or the external impact. The antenna module 300 may be coupled to the lower end of core cap 200, and the lower end of the core cap 200 may be accommodated in the core base 100, thus disposing the antenna module 300 in the center of the lattice core 1000.

An interface for mounting the antenna module 300 by using the core base 100 and core the cap 200 as described above may be provided to thus secure structural/electromagnetic performance of the antenna module 300.

Figure 4:
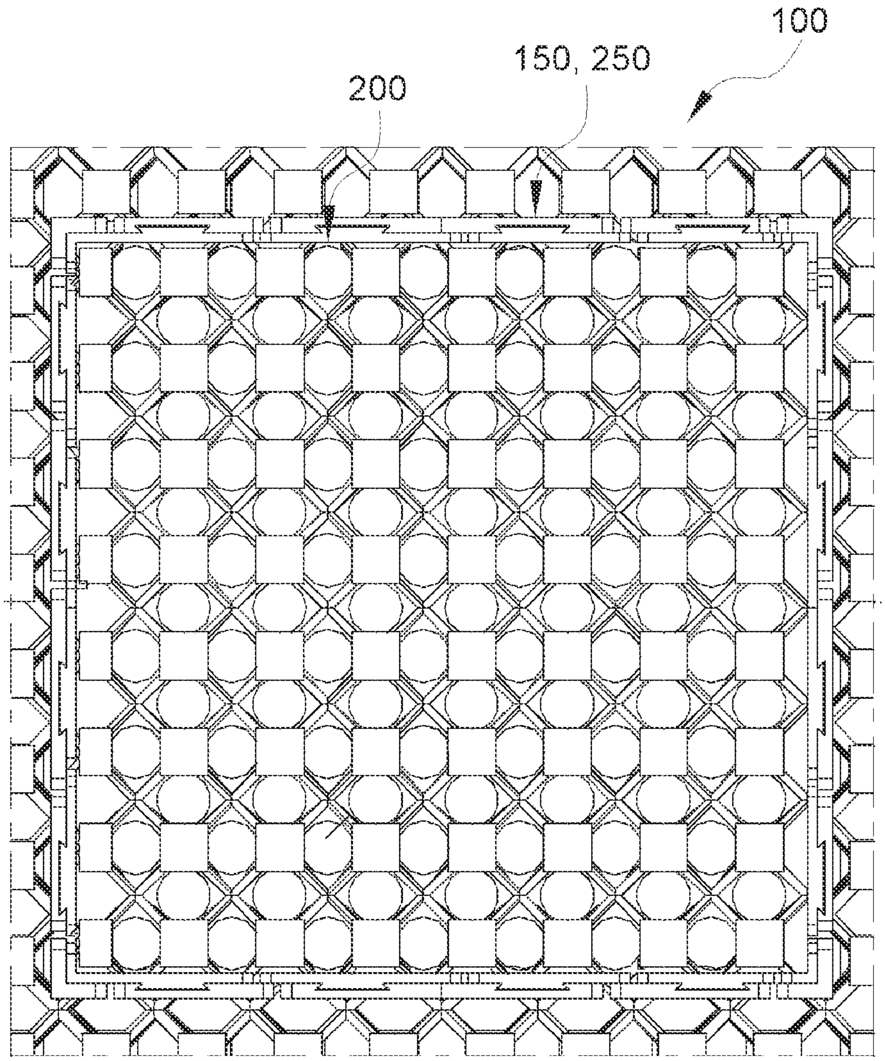
FIG. 4 is a partially enlarged plan view of the lattice core showing a coupled state of a core base and a core cap according to an embodiment of the present disclosure.

FIG. 4 is a partially enlarged plan view of the lattice core 1000 showing a coupling structure of the core base 100 and the core cap 200 according to an embodiment of the present disclosure.

As shown in the drawing, a first coupling part 150 may be formed along an inner periphery of the core cap accommodation groove 110 of the core base 100, and a second coupling part 250 may be formed along an outer periphery of the core cap 200 to thus fit-couple the core cap 200 to the core base 100. Here, the first coupling part 150 may have concave and convex parts repeatedly formed along the periphery, and the second coupling part 250 may have convex and concave parts formed along the periphery to correspond thereto, thus further strengthening the fit-coupling between first coupling part 150 and the second coupling part 250.

Figure 5:
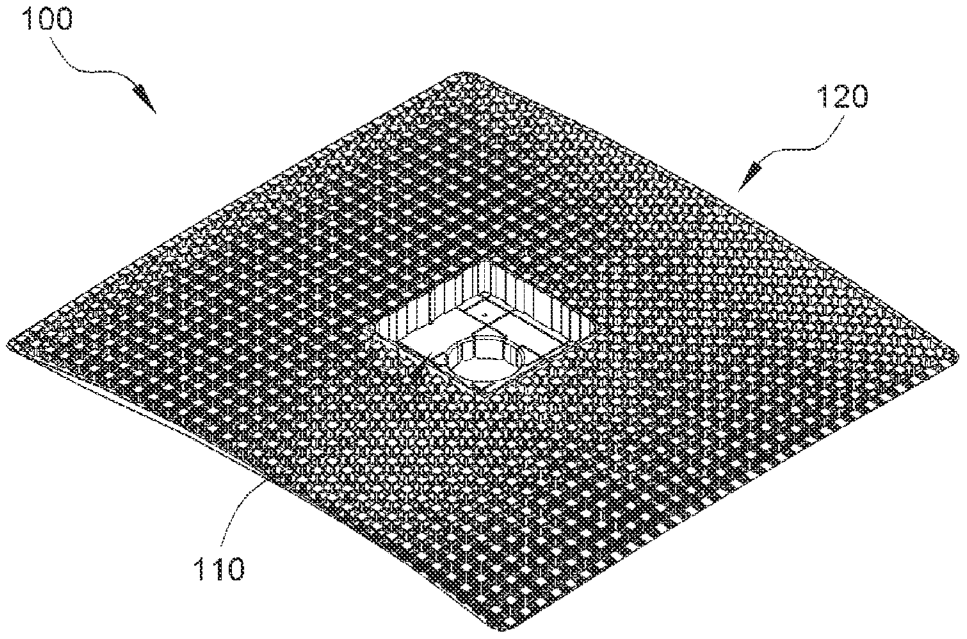
FIG. 5 is a perspective view of the core base according to an embodiment of the present disclosure.
Figure 6:
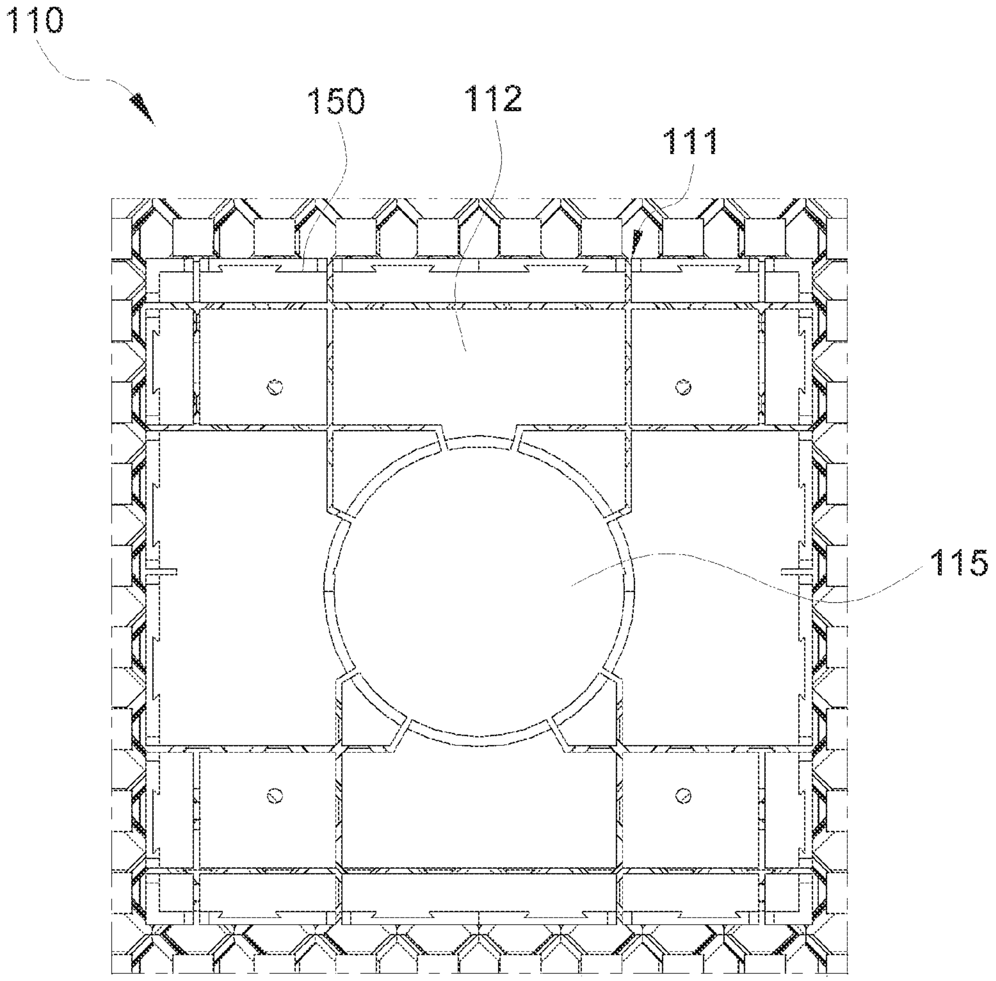
FIG. 6 is a partially enlarged plan view of the core base according to an embodiment of the present disclosure.

FIG. 5 is a perspective view of the core base 100 according to an embodiment of the present disclosure; and FIG. 6 is a partially enlarged plan view of the core base 100 according to an embodiment of the present disclosure. In addition, FIG. 7 is a partially enlarged bottom perspective view of the core base 100 according to an example of the present disclosure.

As shown in FIG. 5, the core base 100 may include a core unit 120 having a repetitive pattern, the antenna module 300 may be accommodated in the center, and the core cap accommodation groove 110 to which the core cap 200 is coupled may also be formed in the center.

Figure 7:
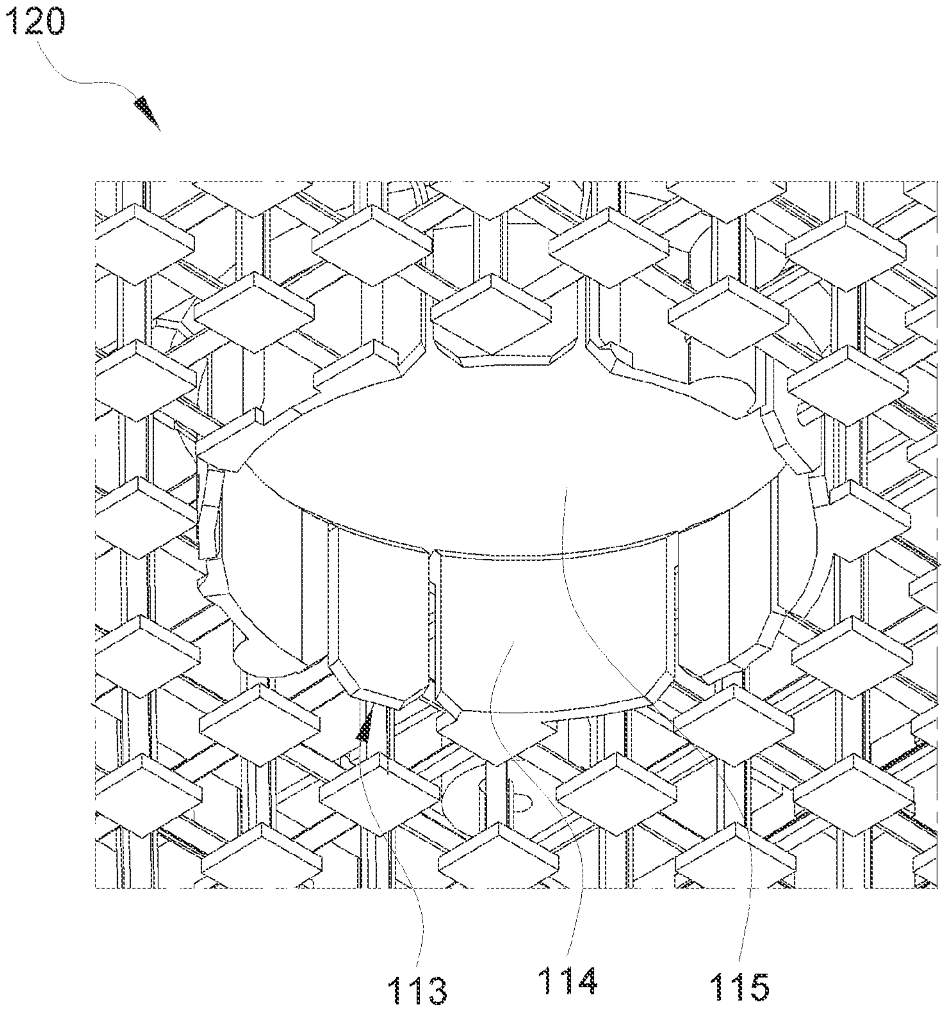
FIG. 7 is a partially enlarged bottom perspective view of the core base according to an example of the present disclosure.

In addition, as shown in FIGS. 6 and 7, a cylinder-shaped power feeder accommodation hole 115 may be formed in a lower surface 111 of the core cap accommodation groove 110 to apply a power feeder of the flat antenna module 300 thereto. The power feeder may be an electrical device transmitting/receiving an electrical signal, and connect the antenna module 300 with an antenna integrated structure disposed outside the antenna module 300 to transmit the electrical signal.

In addition, the lower surface 111 of the core cap accommodation groove 110 may have a cut shape and, more specifically, may be formed by combining a plurality of lower plate units 112 with each other. The lower plate units 112 may be fixed and supported by the core unit 120 described above. The cut structure of the lower surface 111 of the core cap accommodation groove 110 as described above may minimize a stress occurring between the lattice core 100 and a face sheet surrounding the lattice core 100 when the lattice core 100 is deformed. In particular, the lower surface 111 may be cut horizontally and vertically by the lower plate unit 112, thus generating structural flexibilities of the core cap accommodation groove 110 of the core base 100 and the core cap 200 despite the structural deformation caused by a load acting on the antenna integrated structure, thereby minimizing structural displacement transmitted to the antenna module 300.

In addition, a first side plate 113 forming the power feeder accommodation hole 115 may be made by combining a plurality of first panels 114 with each other, and the plurality of first panels 114 may be disposed to be spaced apart from each other in a circumferential direction, and fixed and supported by being coupled with the core unit 120.

Figure 8:
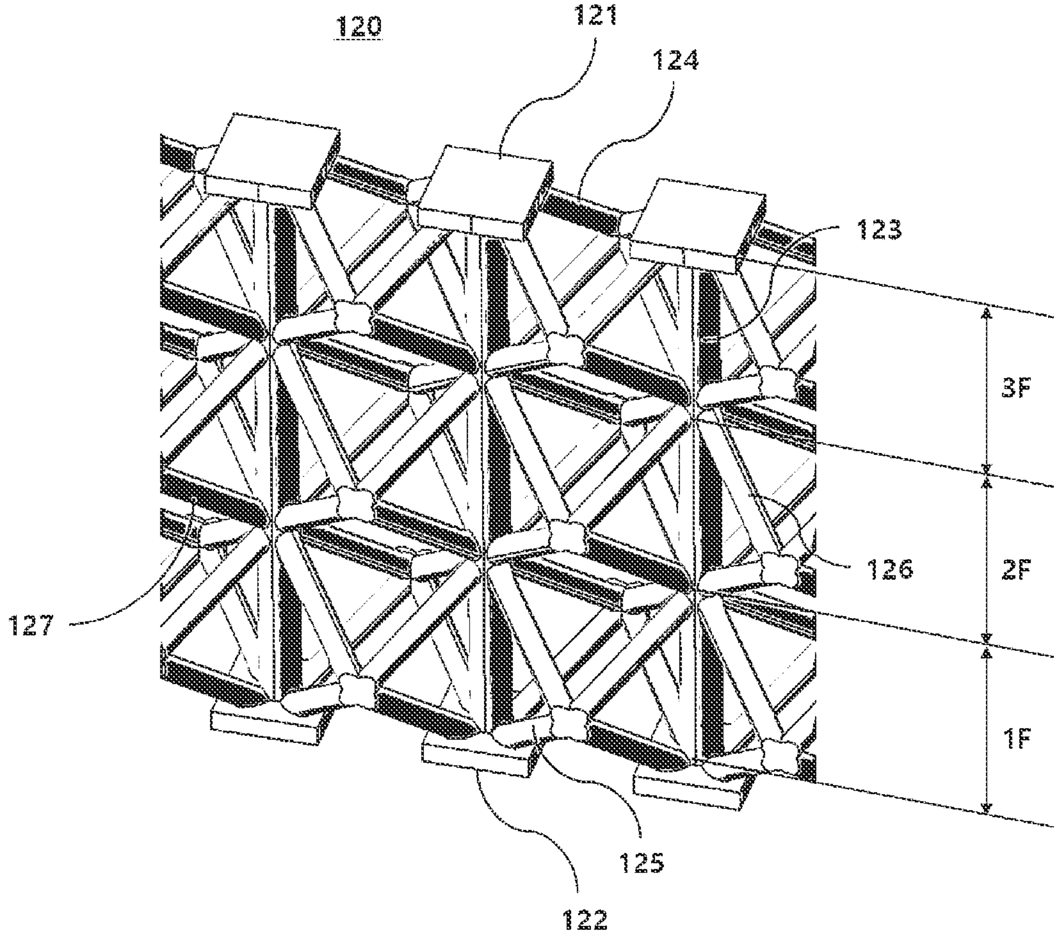
FIG. 8 is a perspective view of a core unit according to an embodiment of the present disclosure.

FIG. 8 is a perspective view of the core unit 120 according to an embodiment of the present disclosure. As shown in the drawing, the core unit 120 may include a square flat upper flange 121, a square flat lower flange 122 disposed below the upper flange 121, and a rod 123 connecting the upper flange 121 with the lower flange 122. In addition, the core unit 120 may include a first arm 124 extending outward in a plane direction of the upper flange 121 and extending obliquely downward, a second arm 125 extending outward in a plane direction of the lower flange 122 and extending obliquely upward, a third arm 126 extending outward in a plane direction of the rod 123 and extending obliquely downward, and a fourth arm 127 extending outward in the plane direction of the rod 123 and extending obliquely upward. The plurality of first to fourth arms 124, 125, 126, and 127 may extend radially in a surface direction.

Here, the core unit 120 may include a first floor 1F where an end of the second arm 124 and an end of the third arm 126 are coupled with each other, a second floor 2F where an end of the third arm 126 that is disposed at the center of the rod 123 and an end of the fourth arm 127 are coupled with each other, and a third floor 3F where an end of first arm 124 and an end of fourth arm 127 are coupled with each other. In addition, the plurality of core units 120 as described above may be repeatedly formed and coupled with each other in the surface direction. The drawing shows the core unit 120 having three floors. However, the plurality of second floors 2F may be added to form four or more floors based on a thickness of the lattice core 1000.

In addition, each of the first to fourth arms 124, 125, 126, and 127 may have an upward or downward inclination angle of 40 to 50 degrees, and preferably have the angle of 45 degrees. The above structure may effectively support a shared load of the lattice core 1000.

In addition, the upper and lower flanges 121 and 122 on a flat plate may improve a joint strength between the lattice core 1000 and the face sheet, and support the vertical impact and load transfer of the lattice core 1000.

Figure 9:
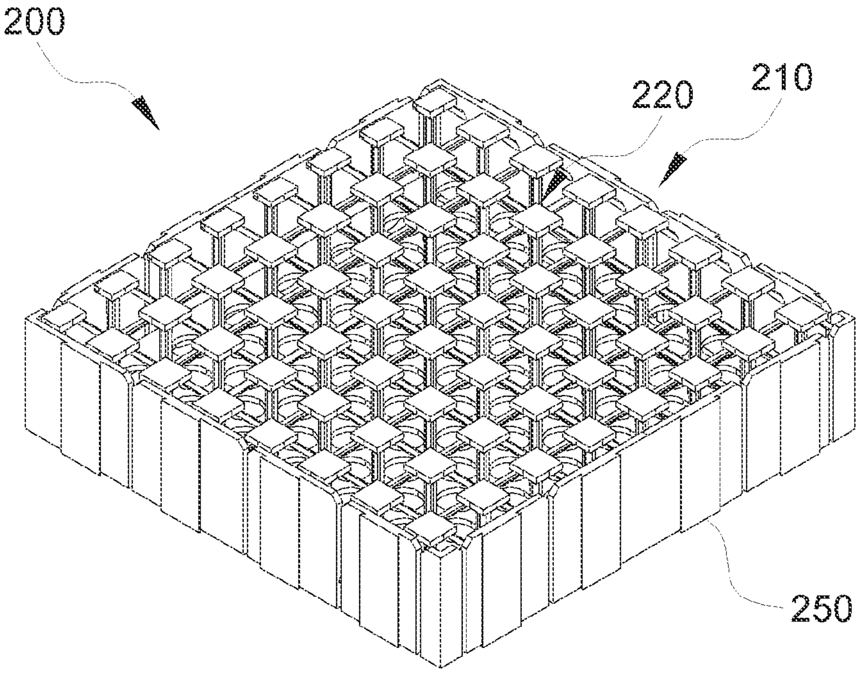
FIG. 9 is a perspective view of the core cap according to an embodiment of the present disclosure.
Figure 10:
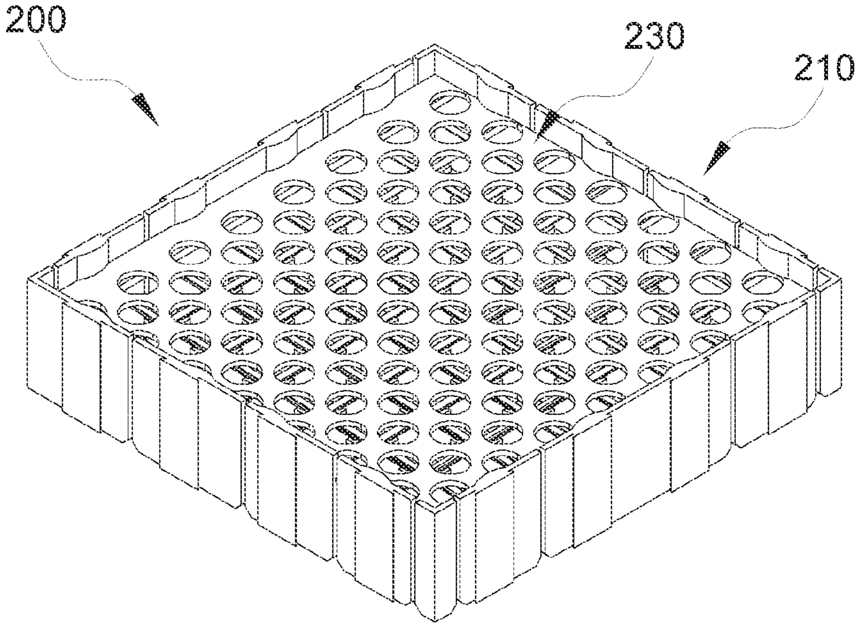
FIG. 10 is a bottom perspective view of the core cap according to an embodiment of the present disclosure.
Figure 11:
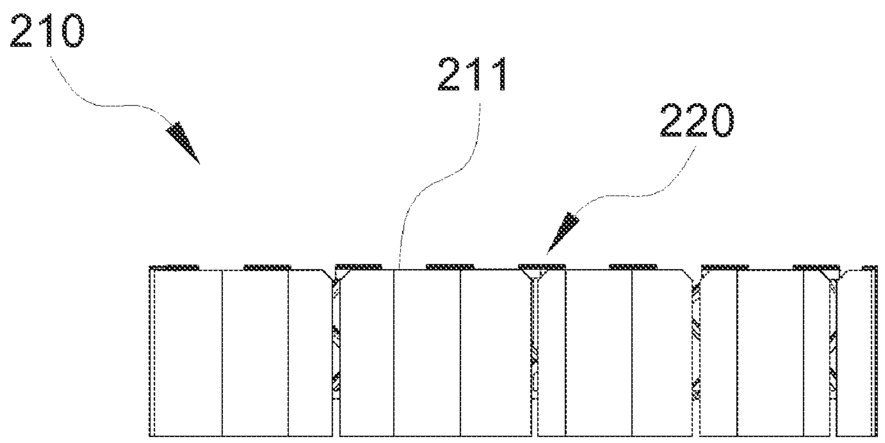
FIG. 11 is a side view of the core cap according to an embodiment of the present disclosure.

FIG. 9 is a perspective view of the core cap 200 according to an embodiment of the present disclosure; and FIG. 10 is a bottom perspective view of the core cap 200 according to an embodiment of the present disclosure.

As shown in the drawings, the core cap 200 may include a core unit 220 having the repetitive pattern, and a second side plate 210 may surround a periphery of the core unit 220 in the surface direction along its periphery. The second coupling part 250 may be formed on an outer surface of the second side plate 210. In addition, an antenna module accommodation groove 230 may be formed in the lower surface of the core cap 200 and recessed downward to accommodate the antenna module in the lower side of the core cap 200.

Here, a lower edge of the core cap 200 may transmit a compressive load that the core cap 200 receives during a vacuum formation in an assembly process of the lattice core 1000 to the core base 100. The lower edge of the core cap 200 may transfer the compressive load to the core base 100 by being in direct contact with four edges of the lower surface 111 of the core cap accommodation groove 110 of the core base 100.

In addition, a pressure acting on the upper side of the core cap 200 vertically toward a surface of the upper flange 121 (see FIG. 8) of the core unit 220 may be transmitted through the rod 123 to a surface of the antenna module accommodated groove 230 in contact with the lower flange 122, and the load may be transmitted to the antenna module 300 through an upper surface of the antenna module 300 accommodated in the antenna module accommodation groove 230. The load transmitted to the antenna module 300 may be transmitted to the lower surface of the lower plate unit 112 of the core base 100 that is in contact with a lower surface of the antenna module 300, and then be transmitted to a support structure or a mold surface through the upper flange 121, rod 123, and lower flange 122 of the core unit 120, which are coupled to a lower side of the lower plate unit 112.

As described above, the pressure acting on the upper side of core cap 200 may be sequentially transmitted to the core cap 200, the core unit 220 disposed in the core cap 200, the antenna module 300, the core base 100, and the core unit 120 disposed in the core base 100.

In addition, the second side plate 210 may have the cut shape, and more specifically, may be formed by combining a plurality of second panels 211 with each other. The second panels 211 may be spaced apart from each other along the periphery, and fixed and supported by being coupled with the core unit 220 described above. The cut structure of the second side plate 210 as described above may minimize the stress occurring between the lattice core 100 and the face sheet surrounding the lattice core 100 when the lattice core 100 is deformed.

Figure 12:
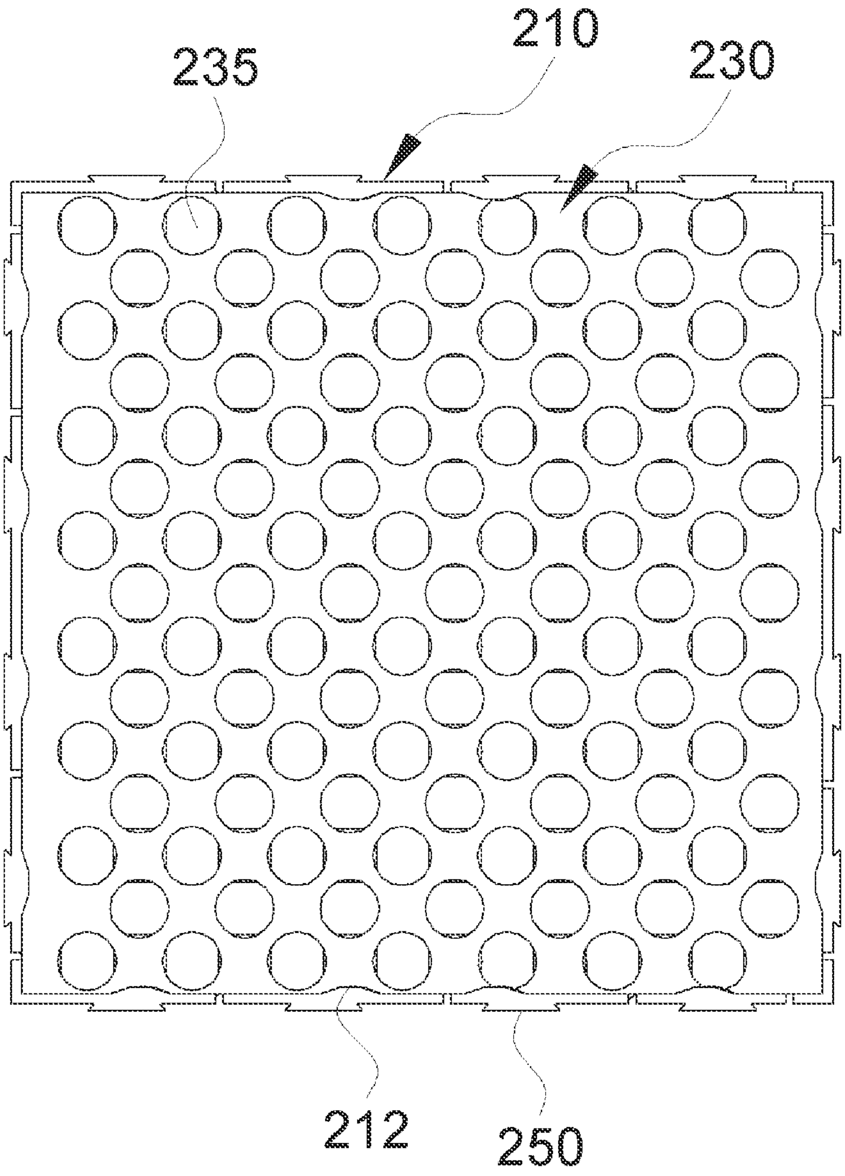
FIG. 12 is a bottom view of the core cap according to an embodiment of the present disclosure.
Figure 13:
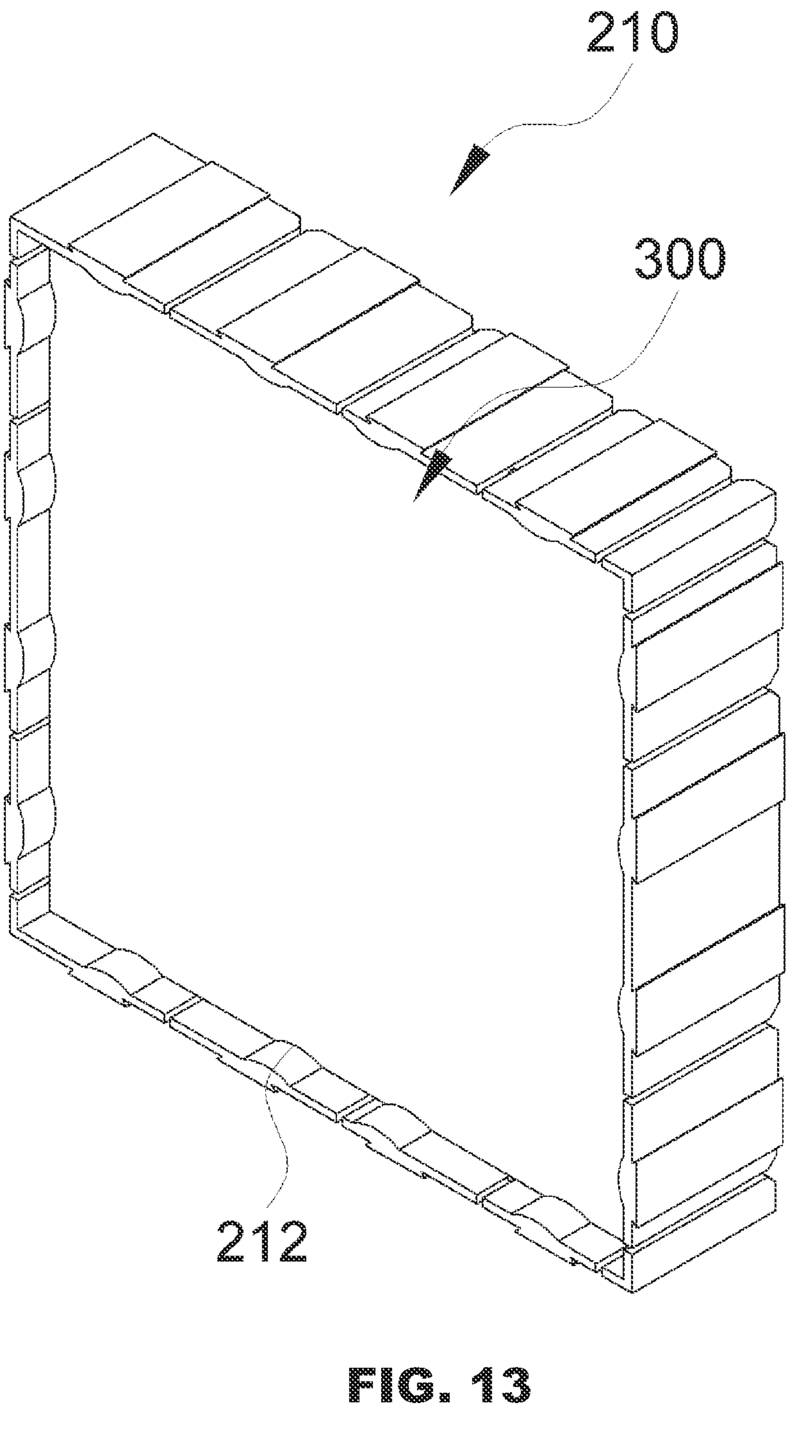
FIG. 13 is a bottom perspective view of the core cap to which an antenna module is attached according to an embodiment of the present disclosure.

FIG. 12 is a bottom view of the core cap 200 according to an embodiment of the present disclosure. In addition, FIG. 13 is a bottom perspective view of the core cap 200 to which an antenna module 300 is attached according to an embodiment of the present disclosure.

As shown in the drawings, the antenna module accommodation groove 230 may be formed in the lower part of the core cap 200, where the antenna module 300 is accommodated and fit-coupled, and a fixing protrusion 212 for fixing the antenna module 300 during the fit-coupling of the antenna module 300 may protrude inward from an inner surface of the antenna module accommodation groove 230, i.e., an inner surface of the second side plate 210. As shown in the drawings, the fixing protrusion 212 may be curved and convexly protrude.

In addition, a plurality of through holes 235 may be formed in a bottom surface of the antenna module accommodation groove 230. The through hole 235 is intended to reduce a weight of the lattice core 100, and this weight reduction may reduce a component weight and minimize electromagnetic wave loss.

As set forth above, the sandwich panel type antenna integrated lattice core of the present disclosure based on the above configuration may apply the antenna module protection structure using the sandwich core thereto to thus prevent the damage or breakage of the antenna module by the external environment, thereby improving the durability of the antenna structure and reducing the maintenance costs.

In addition, in the lattice core of the present disclosure, the three-floor core units may be repeatedly coupled with each other and arranged in the surface direction to improve the impact resistance, thereby improving the durability of the antenna module, and enabling the core to be easily assembled to improve the productivity and reduce the maintenance costs.

The spirit of the present disclosure should not be limited to the embodiment described above. The present disclosure may be applied to various fields and may be variously modified by those skilled in the art without departing from the scope of the present disclosure claimed in the claims. Therefore, it is obvious to those skilled in the art that these alterations and modifications fall within the scope of the present disclosure.

What is claimed is:

1. A sandwich panel type antenna integrated lattice core, the lattice core comprising:

a core base having a certain area space formed below an upper surface for an antenna module to be inserted into an upper center; and a core cap coupled to the upper surface of the core base to seal the space, wherein each of the core base and the core cap has a plurality of sandwich panel-shaped core units repeatedly coupled with each other in a surface direction, wherein the core base includes a core cap accommodation groove recessed downward from a center of the upper surface for the antenna module and the core cap to be accommodated in the groove, and a periphery of an upper surface of the core cap and a periphery of the upper surface of the core base match each other when the core cap is accommodated in the core cap accommodation groove, wherein the core cap includes an antenna module accommodation groove recessed downward from a lower surface to accommodate and fix the antenna module thereto for the antenna module to be disposed in a center of the lattice core when the core cap is accommodated in the core cap accommodation groove.

2. The lattice core of claim 1, wherein a cylinder-shaped accommodation hole for application of a power feeder of the antenna module is formed in a lower surface of the core cap accommodation groove and passes through the core base.

3. The lattice core of claim 2, wherein in the lower surface of the core cap accommodation groove, a plurality of lower plate units are spaced apart from each other, and fixed and supported by the core unit.

4. The lattice core of claim 3, wherein the lower surface of the core cap accommodation groove is cut horizontally and vertically by the lower plate unit.

5. The lattice core of claim 2, wherein in a first side plate forming a side surface of the power feeder accommodation hole, a plurality of first panels are spaced apart from each other along its periphery, and fixed and supported by being coupled with the core unit.

6. The lattice core of claim 1, wherein the core unit includes:

a flat upper flange;

a flat lower flange disposed below the upper flange;

a rod connecting the upper flange with the lower flange;

a first arm extending outward in a plane direction of the upper flange and extending obliquely downward;

a second arm extending outward in a plane direction of the lower flange and extending obliquely upward;

a third arm extending outward in a plane direction of the rod and extending obliquely downward; and a fourth arm extending outward in the plane direction of the rod and extending obliquely upward.

7. The lattice core of claim 6, wherein the core unit includes:

a first floor where an end of the second arm and an end of the third arm are coupled with each other;

a second floor where an end of the third arm that is disposed at a center of the rod and an end of the fourth arm are coupled with each other; and a third floor where an end of the first arm and an end of fourth arm are coupled with each other.

8. The lattice core of claim 7, wherein the plurality of core units are repeatedly formed and coupled with each other in the surface direction.

9. The lattice core of claim 7, wherein each of the first to fourth arms has an upward or downward inclination angle of 40 to 50 degrees.

10. The lattice core of claim 1, wherein the core cap includes the core unit having a repetitive pattern, and a second side plate surrounds a periphery of the core unit in the surface direction along its periphery.

11. The lattice core of claim 10, wherein the second side plate has a plurality of second panels spaced apart from each other along its periphery, and fixed and supported by being coupled with the core unit.

12. The lattice core of claim 10, wherein a load transmitted to the core cap is distributed by being sequentially transmitted to the core cap, the core unit disposed in the core cap, the antenna module, the core base, and the core unit disposed in the core base.

13. The lattice core of claim 1, wherein the core cap transmits a compressive load applied to the core cap to the core base as a lower edge of the core cap is in direct contact with a lower edge of the core cap accommodation groove of the core base.

14. The lattice core of claim 1, wherein a fixing protrusion for fixing the antenna module during fit-coupling of the antenna module protrudes inward from an inner surface of the antenna module accommodation groove.

15. A sandwich panel type antenna integrated lattice core, the lattice core comprising:

a core base having a certain area space formed below an upper surface for an antenna module to be inserted into an upper center; and a core cap coupled to the upper surface of the core base to seal the space, wherein each of the core base and the core cap has a plurality of sandwich panel-shaped core units repeatedly coupled with each other in a surface direction, wherein the core base includes a core cap accommodation groove recessed downward from a center of the upper surface for the antenna module and the core cap to be accommodated in the groove, and a periphery of an upper surface of the core cap and a periphery of the upper surface of the core base match each other when the core cap is accommodated in the core cap accommodation groove, wherein the core cap accommodation groove includes a first coupling part formed along an inner periphery, the core cap includes a second coupling part formed along an outer periphery, the first coupling part has concave and convex parts repeatedly formed along the periphery, and the second coupling part has convex and concave parts formed along the periphery to correspond to the concave and convex parts to thus couple the core cap to the core base by fit-coupling the first coupling part with the second coupling part.

* * * * *